Figure 3:
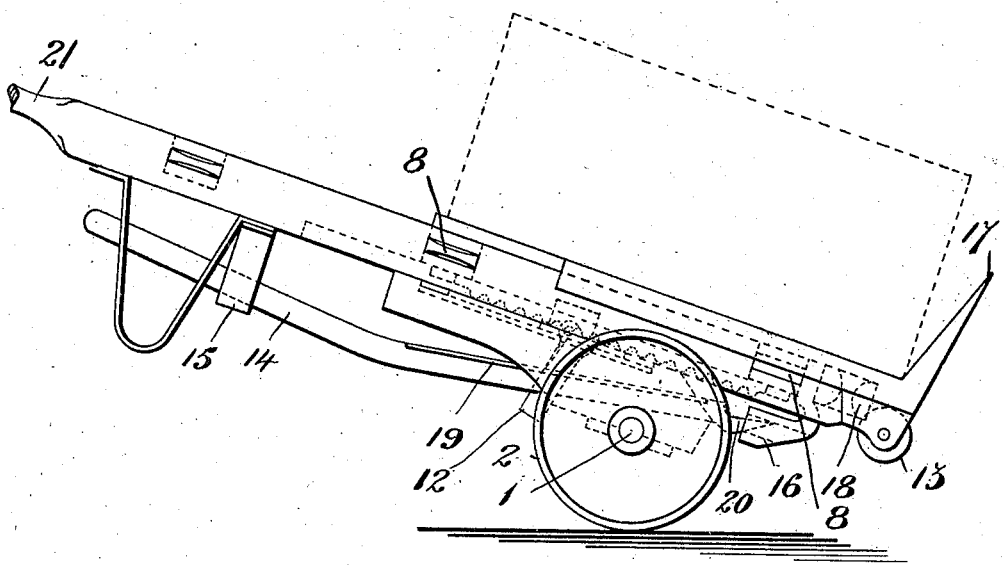

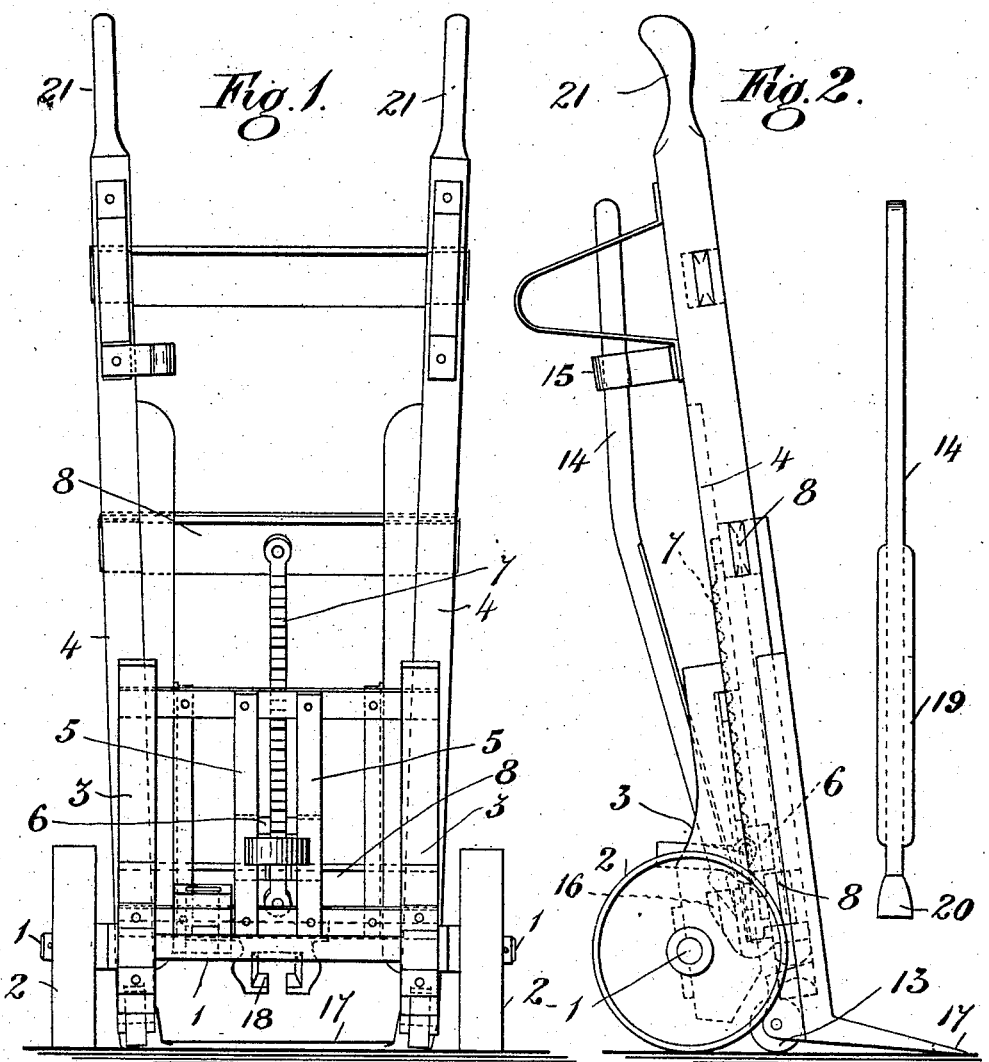

No. 849,996. PATENTED APR. 9, 1907.
F. HASS.
TROLLEY, HAND TRUCK, AND THE LIKE.
APPLICATION FILED MAY 17, 1906.

4 SHEETS—SHEET 2.

No. 849,996. PATENTED APR. 9, 1907.
F. HASS.
TROLLEY, HAND TRUCK, AND THE LIKE.
APPLICATION FILED MAY 17, 1906.
4 SHEETS—SHEET 3.
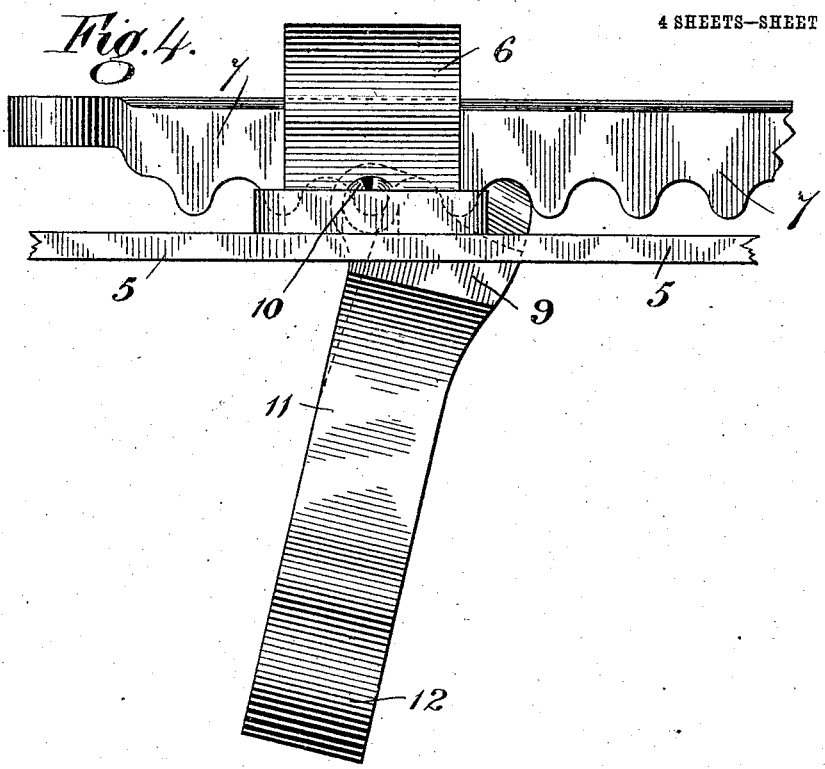
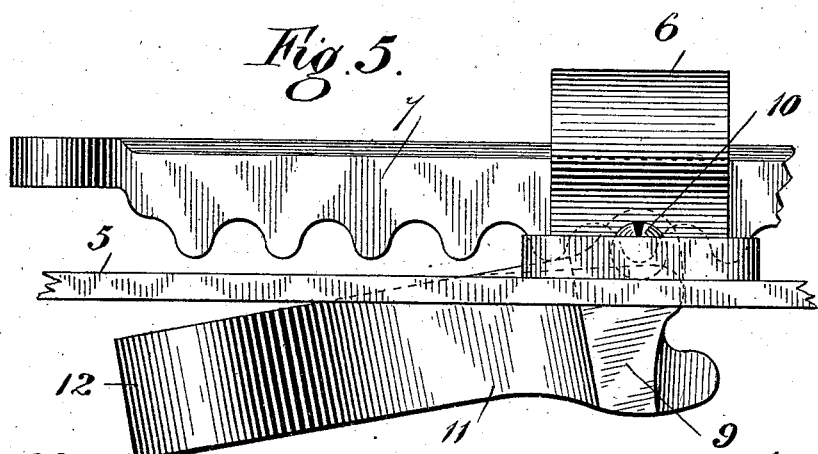
Witnesses:
Inventor
Ferdinand Hass
By James L. Norris
Atty.

No. 849,996. PATENTED APR. 9, 1907.
F. HASS.
TROLLEY, HAND TRUCK, AND THE LIKE.
APPLICATION FILED MAY 17, 1906.
4 SHEETS—SHEET 4.
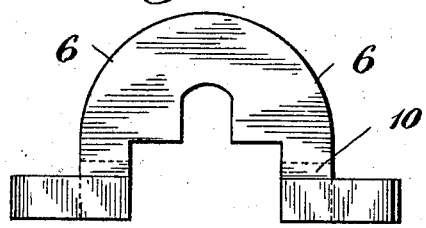
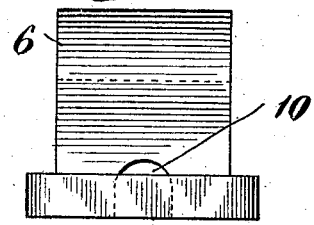
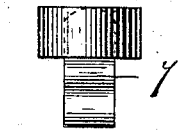
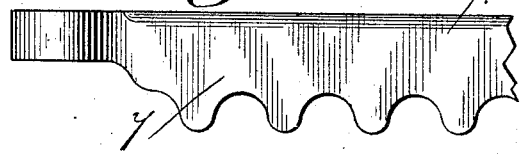
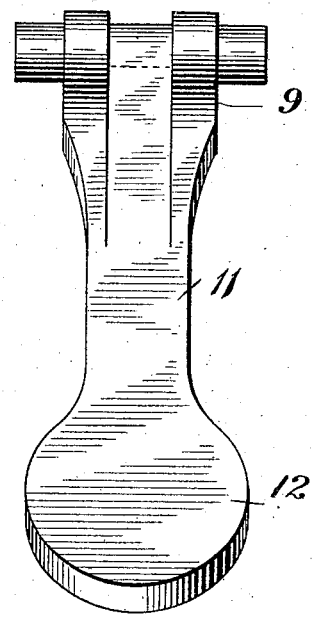
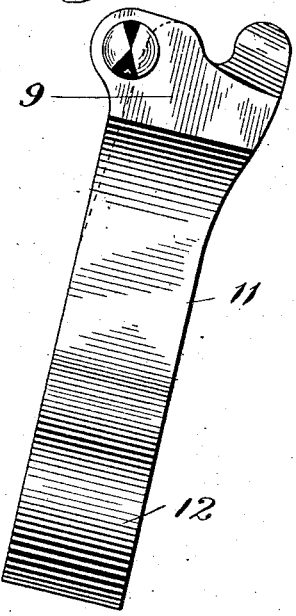
Witnesses:
Inventor
Ferdinand Hass
By James L. Norris,
Atty.
THE NORRIS PETERS CO., WASHINGTON, D. C.

UNITED STATES PATENT OFFICE.

FERDINAND HASS, OF ILFORD, ENGLAND.

TROLLEY, HAND-TRUCK, AND THE LIKE.

No. 849,996.　　　　　Specification of Letters Patent.　　　　　Patented April 9, 1907.

Application filed May 17, 1906. Serial No. 317,336.

*To all whom it may concern:*

Be it known that I, FERDINAND HASS, a citizen of the United States of America, residing at 4 Mansfield road, Ilford, Essex, England, have invented certain new and useful Improvements in Trolleys, Hand-Trucks, and the Like, of which the following is a specification.

The object of this invention is to construct trolleys, hand-trucks, and the like having two wheels with a movable frame or under carriage carrying the axle and wheels in such manner that said frame and wheels can be caused to alter their position under the trolley or truck, so as to form a movable or adjustable fulcrum for the purpose of raising a load onto the trolley or truck in a more easy manner than with the present construction of trolley or truck.

My invention is illustrated in the annexed drawings as applied to an ordinary trolley, Figure 1 being a view of the under side of the trolley; Fig. 2, a side view with a detached plan view of the lever used for raising the edge of a heavy case or the like for the shoe of the trolley to be pushed under it. Fig. 3 is a side view of the trolley as in use. Figs. 4 and 5 are detail side elevations of a fixed rack on the body of the trolley engaged by a pivoted toothed sector on a movable frame, as at Fig. 4, or disengaged, as at Fig. 5. Figs. 6, 7, and 8 are detail front elevations, respectively, on a hollow block or guide on the movable frame, the fixed rack on the body, and the pivoted sector; and Figs. 9, 10, 11 are side elevations of Figs. 6, 7, and 8, respectively.

For the purpose of my invention, I mount the axle 1 and wheels 2 of the trolley or truck on an independent frame or carriage 3, which is so formed as to be slidable under the body proper, 4, of the trolley or truck. Upon the bars 5 of this movable or sliding frame 3 is a hollow block or guide-piece 6, (see Figs. 1, 6, and 9,) serving as a guide for a rack 7, attached to cross-bars 8 8 of the body proper, so that the hollow block or guide 6 may travel along the rack 7 and carry with it the movable frame 3 and the wheels 2, so as to alter the position of the fulcrum.

The movable frame 3 is locked in the desired position by means of a toothed sector 9, pivoted in bearings 10 of the hollow block or guide-piece 6 and carrying a depending arm 11 and treadle-piece 12, this toothed sector 9 being pivoted at a point out of its center line, as shown, (see Figs. 4 and 5,) in such a manner that its teeth are normally in engagement with the rack 7 on the trolley-body; but by moving the depending arm 11 of the sector 9 by pressing the foot on the treadle-piece 12 or otherwise the sector 9 may be swung out of engagement with the rack 7 on the body of the trolley, thus permitting the movable frame 3 to slide freely under the trolley.

13 13 are small wheels or rollers fitted to the end of the trolley, which come into action when the trolley is to be wheeled onto a higher level, such as in getting over a step. In this case the movable frame 3 is allowed to slide back, as at Fig. 3, thus leaving the end of the trolley proper projecting beyond its fulcrum-wheels, whereby the rollers 13 13 can be pushed onto the higher level or step and form a temporary fulcrum until the wheels 2 rest upon the higher level and support the load thereon.

14 is a lever or crowbar which when not in use is supported in the holders or rests 15 16. This lever is employed for assisting in raising the edge of a heavy load to enable the shoe 17 of the trolley to be pushed under it. This is done by passing the lever through the bearing 18 in such manner that its flanges 19 rest within the ledges of the bearing or fulcrum 17 and so that its claw 20 can be prized under the case or load to be lifted by working the handle end of the lever.

By this invention a great saving of labor or exertion is effected, as when it is required to place a heavy or bulky load, such as a packing-case or large piece of furniture, onto the trolley all that is necessary is to push the shoe 17 of the trolley under the load in the usual manner, then with the foot to move the pivoted sector 9 out of engagement with the rack 7, so as to allow the movable frame 3, carrying the wheels 2, to travel backward toward the handles 21 of the trolley, so as to shift the fulcrum and require less exertion in tilting the trolley to raise the load and balance it on the trolley. The movable frame 3 can then be locked in that position, if desired, by releasing the treadle-arm 11 of the toothed sector 9, so that the latter falls into engagement with the rack 7.

What I claim, and desire to secure by Letters Patent, is—

1. In trolleys, hand-trucks, and the like, the combination of body-frame 4 fitted with rack 7, slidable underframe 3 carrying the axle 1 and wheels 2, and fitted with guide-block 6 carrying pivoted sector 9 engaging said rack 7 on the body-frame 4, substantially in the manner specified and for the purpose set forth.

2. In trolleys, hand-trucks, and the like, the combination of trolley-frame 4, rack 7, slidable underframe 3 carrying axle 1 and wheels 2, guide-block 6 on said underframe and carrying pivoted sector 9, bearing 18, lever 14, and rollers 13 on frame 4, substantially as described.

3. In trolleys, hand-trucks and the like having a frame fitted with a rack, a slidable under carriage having wheels, a guide-block, and sector eccentrically pivoted on said block and engaging said rack on the frame.

4. In trolleys, hand-trucks and the like having a frame provided with a rack, the combination of an under carriage having wheels, bars on said carriage, a guide-block mounted on said bars and carrying a pivoted sector engaging said rack on the frame.

5. In trolleys, hand-trucks and the like having a frame fitted with a rack, a slidable under carriage having wheels, a guide-block, a sector pivoted on said block adapted to engage said rack on the frame, and a treadle portion formed integral with said sector.

6. In trolleys, hand-trucks and the like, a frame having a shoe, a bearing located adjacent to said shoe, and a lever for removably engaging said bearing.

In testimony whereof I have hereunto set my hand in presence of two subscribing witnesses.

FERDINAND HASS.

Witnesses:
  PERCY E. MATTOCKS,
  F. C. SMITH.